United States Patent
Rogg et al.

(10) Patent No.: US 7,310,946 B2
(45) Date of Patent: Dec. 25, 2007

(54) CIRCUIT ARRANGEMENT FOR COOLING CHARGE AIR AND METHOD FOR OPERATING A CIRCUIT ARRANGEMENT OF THIS TYPE

(75) Inventors: Stefan Rogg, Stuttgart (DE); Annegret Srnik, Esslingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 0 days.

(21) Appl. No.: 10/565,964

(22) PCT Filed: Jul. 15, 2004

(86) PCT No.: PCT/EP2004/007827

§ 371 (c)(1),
(2), (4) Date: Jan. 26, 2006

(87) PCT Pub. No.: WO2005/012707

PCT Pub. Date: Feb. 10, 2005

(65) Prior Publication Data

US 2006/0185362 A1    Aug. 24, 2006

(30) Foreign Application Priority Data

Jul. 31, 2003  (DE) .................................. 103 35 567

(51) Int. Cl.
- F02B 29/04 (2006.01)
- F02B 33/44 (2006.01)
- F02B 33/00 (2006.01)
- F01P 9/00 (2006.01)
- F01P 1/00 (2006.01)

(52) U.S. Cl. ........................ 60/599; 60/612; 123/563; 123/41.01; 123/41.56

(58) Field of Classification Search .................. 60/599, 60/612; 123/562, 563, 542, 41.56, 41, 41.01, 123/41.05, 41.29; F02B 29/04, 37/00
See application file for complete search history.

(56) References Cited

U.S. PATENT DOCUMENTS

| | | | |
|---|---|---|---|
| 3,257,797 A * | 6/1966 | Lieberherr | 60/612 |
| 3,355,877 A | 12/1967 | Chaffiotte | |
| 3,977,195 A | 8/1976 | Treuil | |
| 4,485,624 A * | 12/1984 | Melchior | 60/599 |
| 5,269,143 A | 12/1993 | Cikanek et al. | |

(Continued)

FOREIGN PATENT DOCUMENTS

AT      006 051 U1      3/2003

(Continued)

*Primary Examiner*—Thai-Ba Trieu
(74) *Attorney, Agent, or Firm*—Foley & Lardner LLP

(57) ABSTRACT

The invention relates to a circuit arrangement (K) comprising a low-temperature circuit (NK) for cooling charge air (13) that is fed to a motor (8) in a motor vehicle equipped with a turbocharger. According to the invention, the charge air (13) is compressed in two stages in a first low-pressure turbocharger (1) and a second high-pressure turbocharger (2). To cool the charge air (13) a first cooler (3) is provided downstream of the low-pressure turbocharger (1) and upstream of the high-pressure turbocharger (2) and a second cooler (4) is provided downstream of the high-pressure turbocharger (2) and upstream of the motor (8). The invention also relates to a method for operating a circuit arrangement (K) of this type.

21 Claims, 4 Drawing Sheets

U.S. PATENT DOCUMENTS

| | | |
|---|---|---|
| 5,394,854 A | 3/1995 | Edmaier et al. |
| 5,598,705 A | 2/1997 | Uzkan .......................... 60/599 |
| 6,273,076 B1 * | 8/2001 | Beck et al. ................. 123/562 |
| 6,378,308 B1 * | 4/2002 | Pfluger ........................ 60/612 |
| 6,397,598 B1 * | 6/2002 | Pierpont ...................... 60/612 |
| 6,412,279 B1 * | 7/2002 | Coleman et al. .............. 60/612 |
| 6,460,519 B1 * | 10/2002 | Pierpont ...................... 60/612 |
| 6,564,783 B2 | 5/2003 | Chou et al. |
| 6,619,379 B1 * | 9/2003 | Ambros et al. ............. 123/563 |
| 6,651,618 B1 * | 11/2003 | Coleman et al. ............ 123/305 |
| 6,688,280 B2 * | 2/2004 | Weber et al. ................. 60/612 |
| 6,782,849 B2 * | 8/2004 | Roithinger ............... 123/41.56 |
| 6,848,397 B2 * | 2/2005 | Haase ..................... 123/41.01 |
| 6,877,317 B2 * | 4/2005 | Kurihara et al. .............. 60/612 |
| 6,883,314 B2 * | 4/2005 | Callas et al. .................. 60/599 |
| 6,918,251 B2 * | 7/2005 | Yanagisawa et al. ......... 60/612 |
| 6,981,375 B2 * | 1/2006 | Sisken et al. ................. 60/612 |
| 2002/0056444 A1 | 5/2002 | Chou et al. .................. 123/563 |

FOREIGN PATENT DOCUMENTS

| | | |
|---|---|---|
| AT | 006 106 U1 | 4/2003 |
| DE | 2923852 A * | 12/1979 |
| DE | 199 48 220 A1 | 1/2001 |
| DE | 696 17 090 T2 | 6/2002 |
| EP | 0 522 471 A1 | 1/1993 |
| EP | 1270896 A2 * | 1/2003 |
| EP | 1 336 735 B1 | 10/2005 |
| JP | 2001-342839 | 12/2001 |
| JP | 2004116489 A * | 4/2004 |
| SU | 1546683 A * | 2/1990 |
| WO | WO 2006086211 A1 * | 8/2006 |

* cited by examiner

CIRCUIT ARRANGEMENT FOR COOLING CHARGE AIR AND METHOD FOR OPERATING A CIRCUIT ARRANGEMENT OF THIS TYPE

BACKGROUND OF THE INVENTION

The invention relates to a circuit arrangement for cooling charge air in a motor vehicle equipped with a turbocharger, and to a method for operating a circuit arrangement of this type. According to the prior art, to increase the power of engines, turbochargers are used in order to increase the throughput of air in the engine. In the compression needed for this, the air, designated below as charge air, is heated because of the compression in the turbocharger. To compensate for the loss of density associated with the heating of the charge air, i.e. in order to increase the air density, air coolers are used which are arranged at the front of the cooling module and serve for cooling the charge air. The charge air in this case flows through a heat exchanger, through which ambient air flows and which is consequently cooled. It is thereby possible to cool the charge air to a temperature which is approximately 15 K above the temperature of the ambient air.

It is furthermore known that the cooling of the charge air takes place via a coolant circuit, for example a low-temperature circuit, in which the coolant is cooled to very low temperatures. By means of this cold coolant, the charge air is cooled down to a predetermined cooling temperature in a charge air/coolant cooler. For the connection of the low-temperature circuit, there are two variants, namely an integration of the low-temperature circuit into a secondary circuit of the engine cooling system or a design in the form of a separate circuit.

If the engine output is to be further increased, the known supercharging systems have their limits, with respect to supercharging rates and response characteristics, at low load.

The object of the invention is to improve a circuit arrangement of the type mentioned in the introduction.

SUMMARY OF THE INVENTION

According to the invention, a circuit arrangement is proposed comprising a low-temperature circuit for cooling charge air that is fed to an engine in a motor vehicle equipped with a turbocharger, characterized in that the charge air is compressed in two stages in a first low-pressure turbocharger and a second high-pressure turbocharger, where, in order to cool the charge air, a first cooler is provided downstream of the low-pressure turbocharger and upstream of the high-pressure turbocharger, and a second cooler is provided downstream of the high-pressure turbocharger and upstream of the engine. By means of the intermediate cooling downstream of the first low-pressure turbocharger, it is possible to ensure that excessively high air temperatures do not arise, as a result of which the service time of the used components, which are exposed to the high temperatures, can be increased. The two-stage cooling exhibits an advantageous dynamic behavior. Since the intermediate cooling in partial load takes up scarcely any thermal loads, the coolant contained in the low-temperature circuit is cooled to a low temperature level just above the ambient temperature. This results in a substantial cooling power reserve which can be utilized when switching to high engine load.

The installation space required is relatively small compared to the known solutions, since, despite the intermediate cooling, there is only one charge air line to and from the cooling module, and only one coolant-cooled charge air cooler to be arranged near the engine.

A low-pressure charge air/coolant cooler is preferably provided for the first cooling of the charge air, and a high-pressure charge air/air cooler is provided for the second cooling of the charge air. In this case, stability problems are avoided in the air-cooled high-pressure charge air/air cooler particularly through the intermediate cooling.

The installation space can be utilized optimally by virtue of the fact that the high-pressure charge air/air cooler is arranged directly alongside a low-temperature cooler and, seen in the direction of air flow of the cooling air, upstream of a main coolant cooler. The front face of the low-temperature cooler takes up preferably 20% to 50% of the total front surface.

According to a preferred variant, the low-temperature circuit is part of an engine cooling circuit, but it can also be designed separately from this, and a control system for cutting down on costs is not absolutely essential. Also possible is an intermediate cooling with air and/or a cooling of the charge air downstream of the second compression stage with the aid of a coolant.

BRIEF DESCRIPTION OF THE DRAWINGS

The invention is explained in detail below on the basis of two illustrative embodiments and with reference to the drawing, in which:

FIG. 1 shows a circuit arrangement K which serves for cooling two successive turbochargers, namely a low-pressure turbocharger 1 and a high-pressure turbocharger 2. The charge air designated by reference label 13 is sucked in from the environment and compressed in the low-pressure turbocharger 1 in a first stage. In so doing, the temperature of the charge air 13 increases. To achieve a further compression without adversely affecting the service life as a result of overheating of the structural parts in direct or indirect contact with the charge air 13, which is the case of aluminum at temperatures starting from about 230° C., the compressed charge air is cooled in a low-pressure charge air/coolant cooler 3 which is part of a low-temperature circuit NK. The charge air 13 after the first cooling stage in the low-pressure turbocharger 1 may have a temperature of between 40° C. and 110° C. The low-temperature circuit NK is discussed in more detail below.

After the cooling in the low-pressure charge air/coolant cooler 3, the charge air 13 passes into the high-pressure turbocharger 2 in which it is further compressed to its end pressure, which is in turn associated with heating. In order to increase the charge air density in the (combustion) engine 8, the hot charge air 13 is cooled in a charge air/air cooler 4 before being fed to the engine 8. As a result of the intermediate cooling, it is possible to ensure that the maximum charge air temperatures after the last turbocharger stage remain limited to a degree which permits the use of air-cooled charge air coolers (cf. FIG. 3). This is advantageous in respect of the costs and the available installation space.

The low-pressure charge air/coolant cooler 3 for the intermediate cooling is arranged near the engine and is supplied by the separate low-temperature circuit NK. An air cooler, hereinafter referred to as low-temperature cooler 5, is provided in the low-temperature circuit NK and is traversed by the low-temperature coolant 14 flow in connection with the low-pressure charge air/coolant cooler 3.

Figure 1:
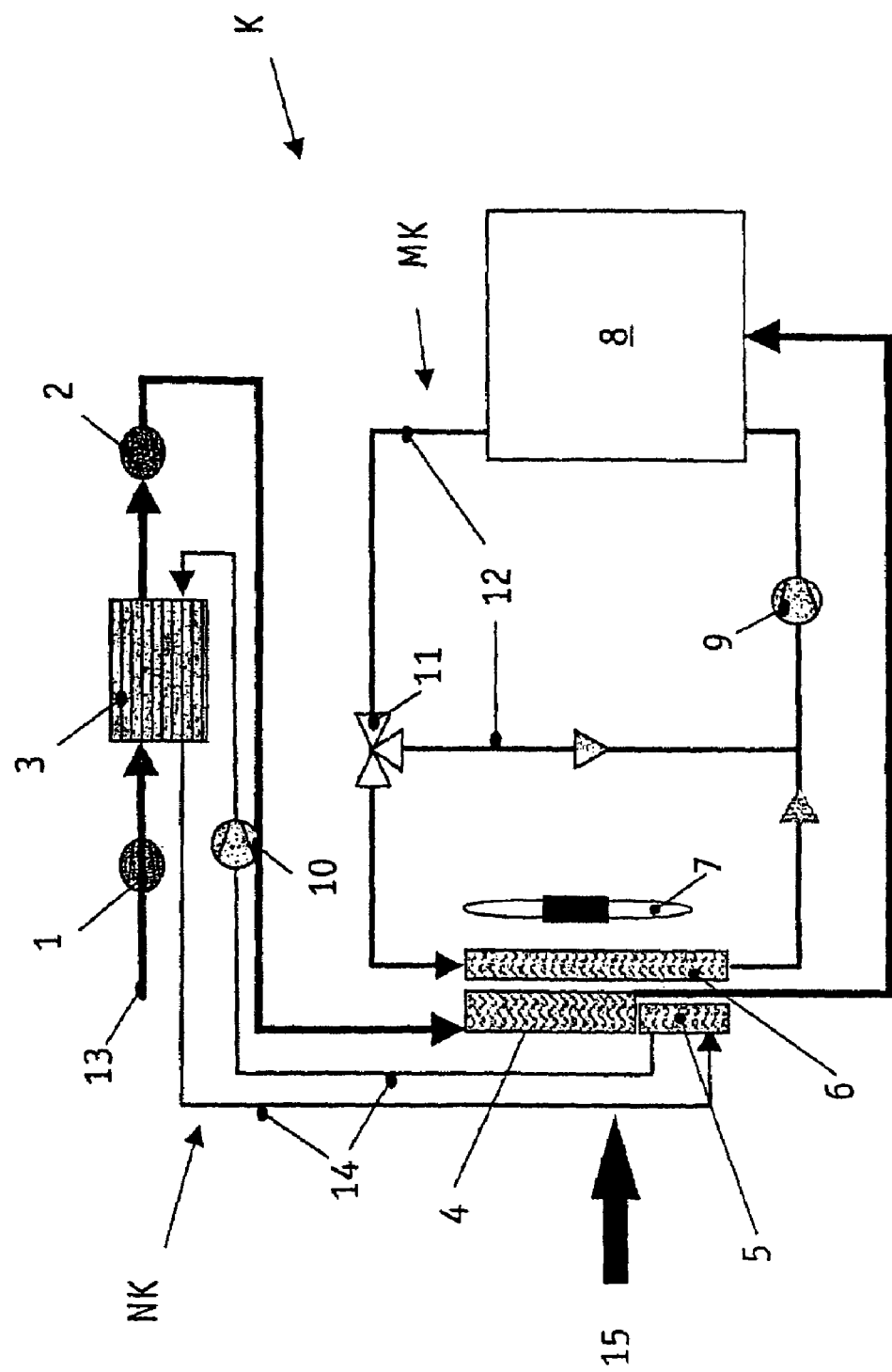
FIG. 1 shows a circuit arrangement according to the first illustrative embodiment.
Figure 4:
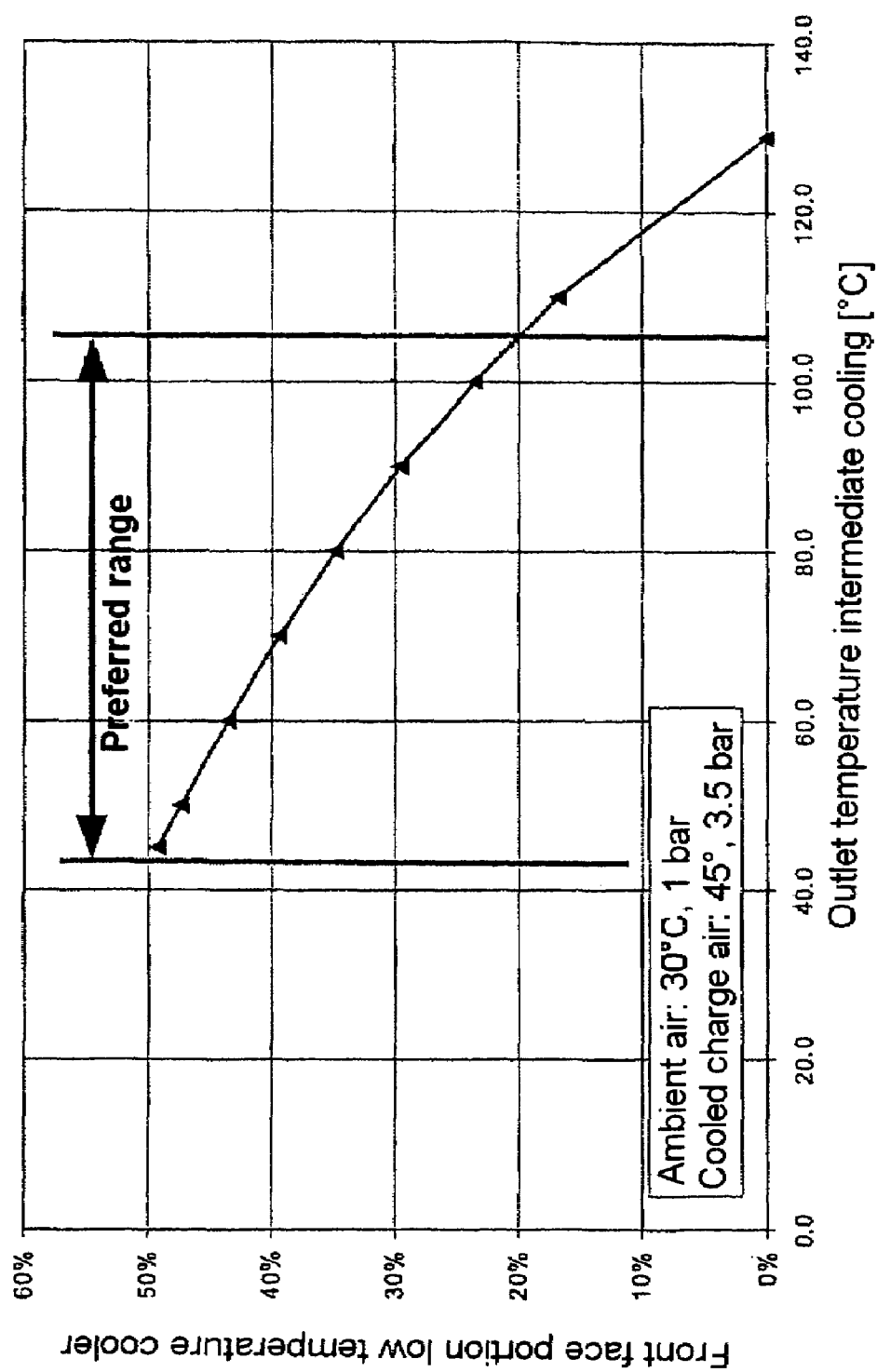
FIG. 4 shows a graph which shows the front face portion of the low-temperature cooler over the outlet temperature of the intermediate cooling.

As is shown in FIG. 1, the low-temperature cooler 5 is arranged directly next to the high-pressure charge air/air cooler 4, both of which, seen in the direction of flow of the cooling air 15, are arranged upstream of a main coolant cooler 6. The air is sucked in by a fan 7 which is arranged behind the main coolant cooler 6. The low-temperature cooler 5 is dimensioned such that its end face takes up between 20% and 50% of the maximum possible end face in the cooling module (see FIG. 4). Alternatively, the low-temperature cooler 5 can also be arranged in the air flow upstream of the air-cooled high-pressure charge air/air cooler 4.

The coolers are in this case arranged in such a way that coolers which are at a low medium temperature level are positioned in the cold cooling air stream and coolers which are at a high temperature level are positioned in the warm cooling air stream.

The low-temperature coolant 14 flows onward to the pump 10, which ensures circulation of the coolant 14, and from there back to the low-pressure charge air/coolant cooler 3.

According to the present illustrative embodiment, the low-temperature coolant circuit NK is not controlled; it can be set in such a way that the best possible charge air cooling is achieved but boiling problems in the coolant 14 cannot however occur. The low-temperature coolant circuit NK contains relatively little coolant 14. The boiling problems are easily avoided because very high charge air temperatures do not occur at the outlet of the first compressor stage.

The engine 8 is cooled by an engine cooling circuit MK in which an engine coolant 12 flows. The coolant 12 cooled in the main coolant cooler 6 is fed to the engine 8 via the pump 9. The control of the cooling performance is effected via a bypass thermostat 11 in a manner known per se.

Figure 2:
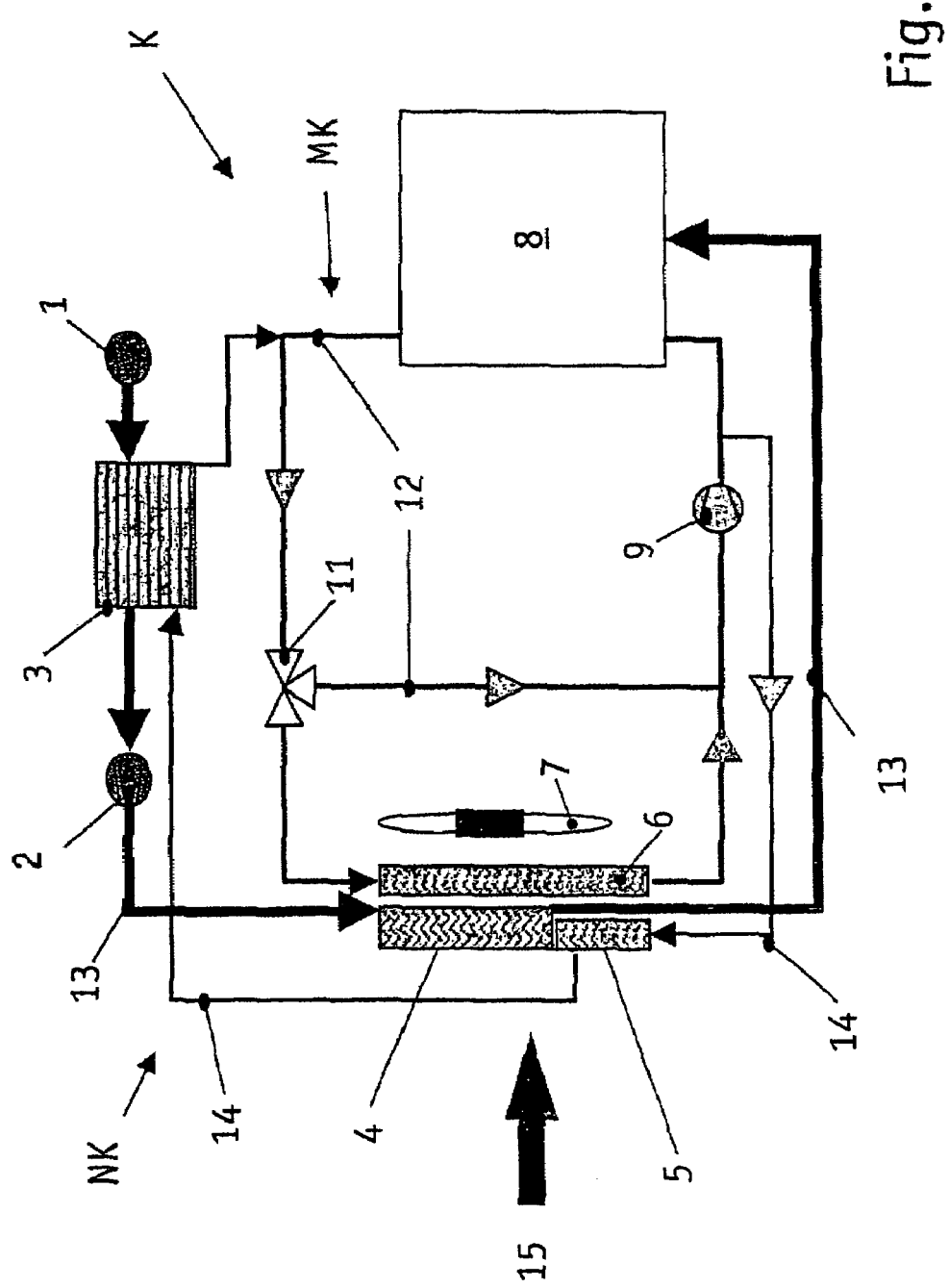
FIG. 2 shows a circuit arrangement according to the second illustrative embodiment.
Figure 3:
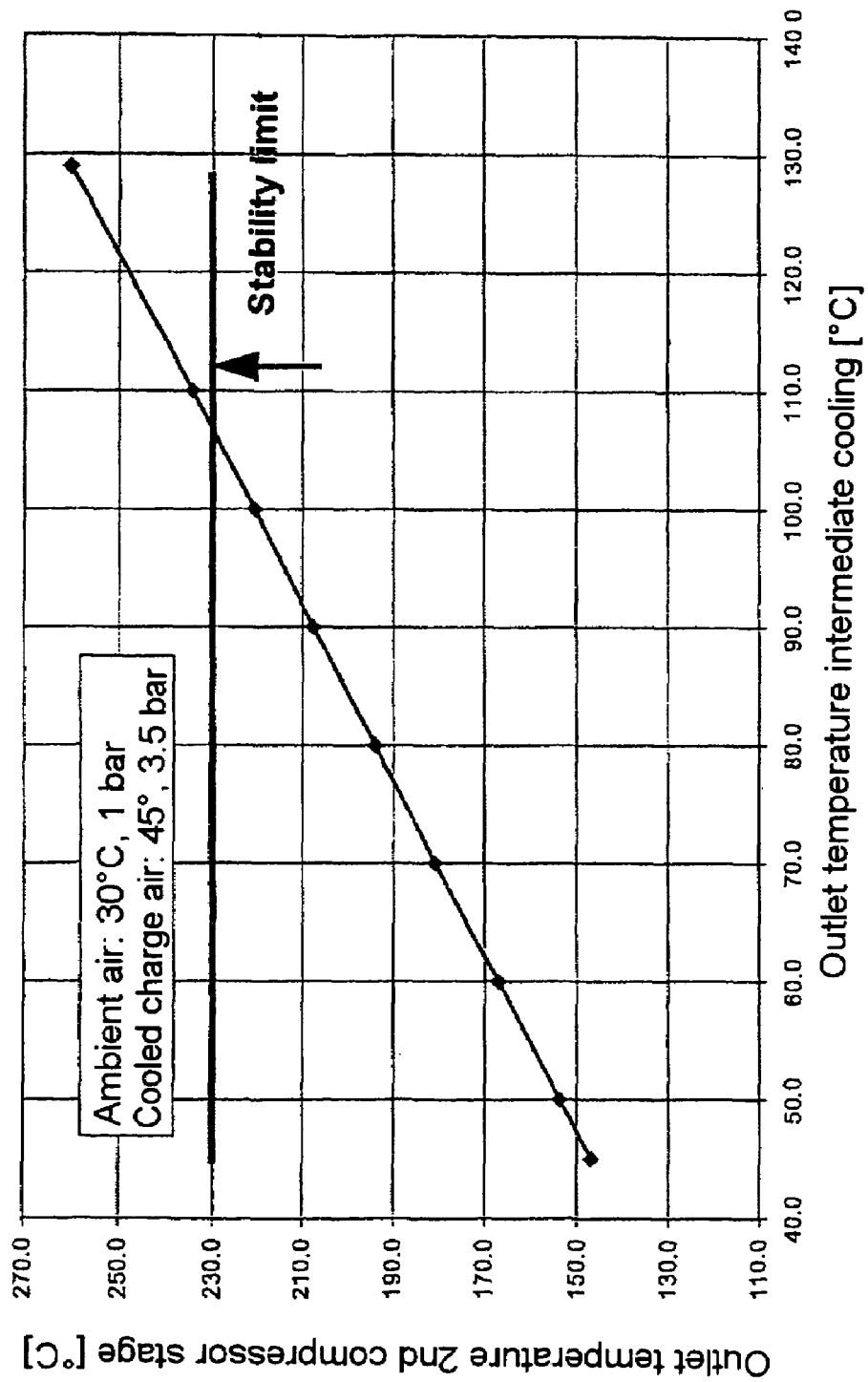
FIG. 3 shows a graph which shows the outlet temperature of the second compressor stage over the outlet temperature of the intermediate cooling.

FIG. 2 shows a circuit arrangement K according to a second illustrative embodiment which essentially coincides with that of the first illustrative embodiment unless otherwise described below. The same reference labels are used here.

In a departure from the first illustrative embodiment, no separate low-temperature circuit NK is provided in the second illustrative embodiment. The coolant 14 is instead branched off from the engine cooling circuit MK from the pressure side of the pump 9 and is fed to the low-temperature cooler 5. In the low-temperature cooler 5, the coolant 14 is sharply cooled and then flows to the coolant-cooled low-pressure charge air/coolant cooler 3, where it serves for the intermediate cooling of the charge air 13. The coolant 14 is then mixed again at the engine outlet with the coolant stream of the engine cooling circuit MK.

LIST OF REFERENCE LABELS

1 low-pressure turbocharger
2 high-pressure turbocharger
3 low-pressure charge air/coolant cooler
4 high-pressure charge air/air cooler
5 low-temperature cooler
6 main coolant cooler
7 fan
8 engine
9 pump
10 pump
11 thermostat
12 coolant
13 charge air
14 low-temperature coolant
15 cooling air
K circuit arrangement
MK engine cooling circuit
NK low-temperature circuit

The invention claimed is:

1. A method for operating a circuit arrangement, wherein the circuit arrangement comprises a low-temperature circuit for cooling charge air that is fed to an engine in a motor vehicle equipped with turbochargers, comprising:
   compressing the charge air in a first compressing stage with a first low-pressure turbocharger,
   cooling the charge air in a first cooling stage using a low-pressure charge air/coolant cooler provided downstream of the low-pressure turbocharger and upstream of a second high-pressure turbocharger, wherein coolant from the low-pressure charge air/coolant cooler flows into a coolant/air cooler;
   further compressing the cooled charge air in a second compressing stage with the second high-pressure turbocharger; and
   cooling the further compressed charge air in a second cooling stage using a high-pressure charge air/air cooler provided downstream of the high-pressure turbocharger and upstream of the engine,
   wherein the high-pressure charge air/air cooler is configured to use air flow of cooling air in a main cooling circuit upstream of a main coolant cooler as seen in a direction of the air flow of the cooling air.

2. The method for operating a circuit arrangement as claimed in claim 1, wherein the charge air after the first cooling stage has a temperature of between 40° C. and 110° C.

3. A circuit arrangement comprising:
   a low-temperature circuit for cooling charge air that is fed to an engine in a motor vehicle equipped with turbochargers,
   wherein the low-temperature circuit comprises:
      a first low-pressure turbocharger for compressing the charge air in a first compressing stage;
      a second high pressure turbocharger for compressing the charge air in a second compressing stage;
      a first cooler provided downstream of the low-pressure turbocharger and upstream of the high-pressure turbocharger for cooling the charge air in a first cooling stage;
      a second cooler provided downstream of the high-pressure turbocharger and upstream of the engine for cooling the charge air in a second cooling stage, and
      a third cooler, wherein the third cooler and the second cooler form a cooling module, wherein a front face of the third cooler takes up 20% to 50% of a total front surface of the cooling module,
   wherein the low-temperature circuit is part of an engine cooling circuit.

4. The circuit arrangement as claimed in claim 3, wherein the low-temperature circuit branches off from a pressure side of a pump from the engine cooling circuit and is fed back to the engine cooling circuit at an engine outlet.

5. The circuit arrangement as claimed in claim 3, wherein the first cooler comprises a low-pressure charge air/coolant cooler.

6. The circuit arrangement as claimed in claim 3, wherein the second cooler comprises a high-pressure charge air/air cooler.

7. The circuit arrangement as claimed in claim 6, wherein the third cooler is a low-temperature cooler.

8. A circuit arrangement comprising:
a low-temperature circuit for cooling charge air that is fed to an engine in a motor vehicle equipped with turbochargers,
wherein the low-temperature circuit comprises:
   a first low-pressure turbocharger for compressing the charge air in a first compressing stage;
   a second high pressure turbocharger for compressing the charge air in a second compressing stage;
   a low-pressure charge air/coolant cooler provided downstream of the low-pressure turbocharger and upstream of the high-pressure turbocharger for cooling the charge air in a first cooling stage;
   a high-pressure charge air/air cooler provided downstream of the high-pressure turbocharger and upstream of the engine for cooling the charge air in a second cooling stage, and
   a third cooler that receives coolant from the low-pressure charge air/coolant cooler,
wherein the high-pressure charge air/air cooler is configured to use air flow of cooling air in a main cooling circuit upstream of a main coolant cooler as seen in a direction of the air flow of the cooling air.

9. The circuit arrangement as claimed in claim 8, wherein the third cooler is a low-temperature cooler, and wherein the high-pressure charge air/air cooler is arranged alongside the low-temperature cooler.

10. The circuit arrangement as claimed in claim 9, wherein the low-temperature cooler and the high-pressure charge air/air cooler form a cooling module, wherein a front face of the low-temperature cooler takes up 20% to 50% of a total front surface of the cooling module.

11. The circuit arrangement as claimed in claim 8, wherein the motor vehicle comprises an engine cooling circuit, wherein the low-temperature circuit is independent of the engine cooling circuit and has its own pump for delivering coolant.

12. The circuit arrangement as claimed in claim 11, wherein the pump in the low-temperature circuit is arranged between the third cooler and the low-pressure charge air/coolant cooler or between the low-pressure charge air/coolant cooler and the third cooler.

13. The circuit arrangement as claimed in claim 8, wherein the low-temperature circuit is part of an engine cooling circuit.

14. The circuit arrangement as claimed in claim 13, wherein the low-temperature circuit branches off from a pressure side of a pump from the engine cooling circuit and is fed back to the engine cooling circuit at an engine outlet.

15. A circuit arrangement comprising:
a low-temperature circuit for cooling charge air that is fed to an engine in a motor vehicle equipped with turbochargers,
wherein the low-temperature circuit comprises:
   a first low-pressure turbocharger for compressing the charge air in a first compressing stage;
   a second high pressure turbocharger for compressing the charge air in a second compressing stage;
   a first cooler provided downstream of the low-pressure turbocharger and upstream of the high-pressure turbocharger for cooling the charge air in a first cooling stage;
   a second cooler provided downstream of the high-pressure turbocharger and upstream of the engine for cooling the charge air in a second cooling stage, wherein the second cooler comprises a high-pressure charge air/air cooler; and
   a third cooler, wherein the third cooler is a low-temperature cooler configured such that low-temperature coolant from the first cooler flows through the low-temperature cooler, wherein the high-pressure charge air/air cooler is arranged alongside the low-temperature cooler and, seen in a direction of air flow of cooling air, upstream of a main coolant cooler.

16. The circuit arrangement as claimed in claim 15, wherein the low-temperature cooler and the high-pressure charge air/air cooler form a cooling module, wherein a front face of the low-temperature cooler takes up 20% to 50% of a total front surface of the cooling module.

17. The circuit arrangement as claimed in claim 15, wherein the first cooler comprises a low-pressure charge air/coolant cooler.

18. The circuit arrangement as claimed in claim 15, wherein the motor vehicle comprises an engine cooling circuit, wherein the low-temperature circuit is independent of the engine cooling circuit and has its own pump for delivering coolant.

19. The circuit arrangement as claimed in claim 18, wherein the pump in the low-temperature circuit is arranged between the low-temperature cooler and the first cooler or between the first cooler and the low-temperature cooler.

20. The circuit arrangement as claimed in claim 15, wherein the low-temperature circuit is part of an engine cooling circuit.

21. The circuit arrangement as claimed in claim 20, wherein the low-temperature circuit branches off from a pressure side of a pump from the engine cooling circuit and is fed back to the engine cooling circuit at an engine outlet.

* * * * *